United States Patent [19]

Van Renseen et al.

[11] 4,261,013
[45] Apr. 7, 1981

[54] KINESCOPE SCREEN CENTER LOCATOR

[75] Inventors: Marinus Van Renseen, Leola; Myron H. Wardell, Jr., Lititz, both of Pa.

[73] Assignee: RCA Corporation, New York, N.Y.

[21] Appl. No.: 107,588

[22] Filed: Dec. 27, 1979

[51] Int. Cl.³ .......................... H04N 7/02; H01J 9/42; H01J 29/54

[52] U.S. Cl. ...................................... 358/139; 316/1; 315/398; 250/561

[58] Field of Search ........................ 358/10, 139, 242; 316/1; 315/364, 370, 398, 10; 313/440; 250/221, 239, 561; 356/399, 400, 375

[56] References Cited

U.S. PATENT DOCUMENTS

| | | | |
|---|---|---|---|
| 3,541,255 | 11/1970 | Yazigi | 358/139 |
| 4,035,834 | 7/1977 | Drury | 358/10 |

OTHER PUBLICATIONS

"Laser Trimming of Monolithic Circuits", *Electronics*, Sep. 27, 1979, (Advertisement by Teradyne).

*Primary Examiner*—John C. Martin
*Attorney, Agent, or Firm*—Eugene M. Whitacre; William H. Meagher; Scott J. Stevens

[57] ABSTRACT

An apparatus for locating the position of the horizontal centerline on the display screen of a television kinescope comprises two screen edge sensors disposed at the top and bottom of the display screen. The edge sensors are mounted on a vertically movable member at a separation equal to the vertical dimension of the display screen. Each edge sensor comprises a light source for directing a beam of light at the kinescope along a first light path and a detector for sensing the different amount of radiation returned from the display screen and the adjacent reflective aluminum coating along a second light path. The sensors are moved until the detector outputs are equal, indicating the sensor is located at similar positions with respect to the top and bottom screen edges. The mid-point between the sensor is then the location of the horizontal centerline of the display screen.

5 Claims, 5 Drawing Figures

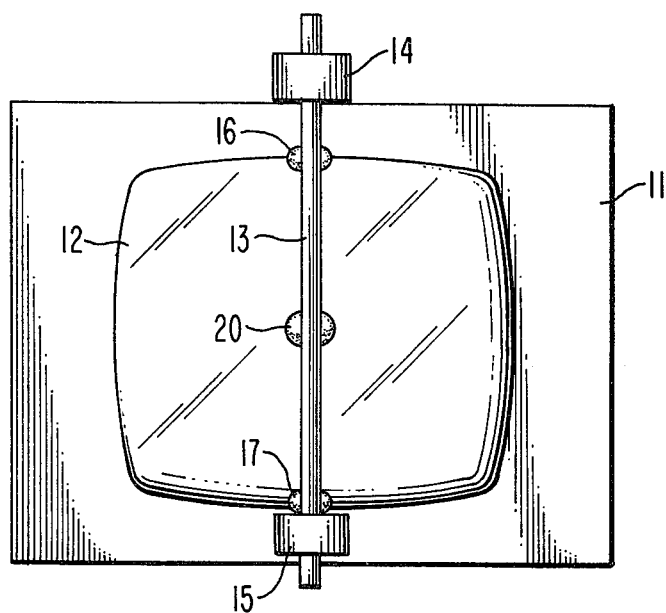
Fig. 1.
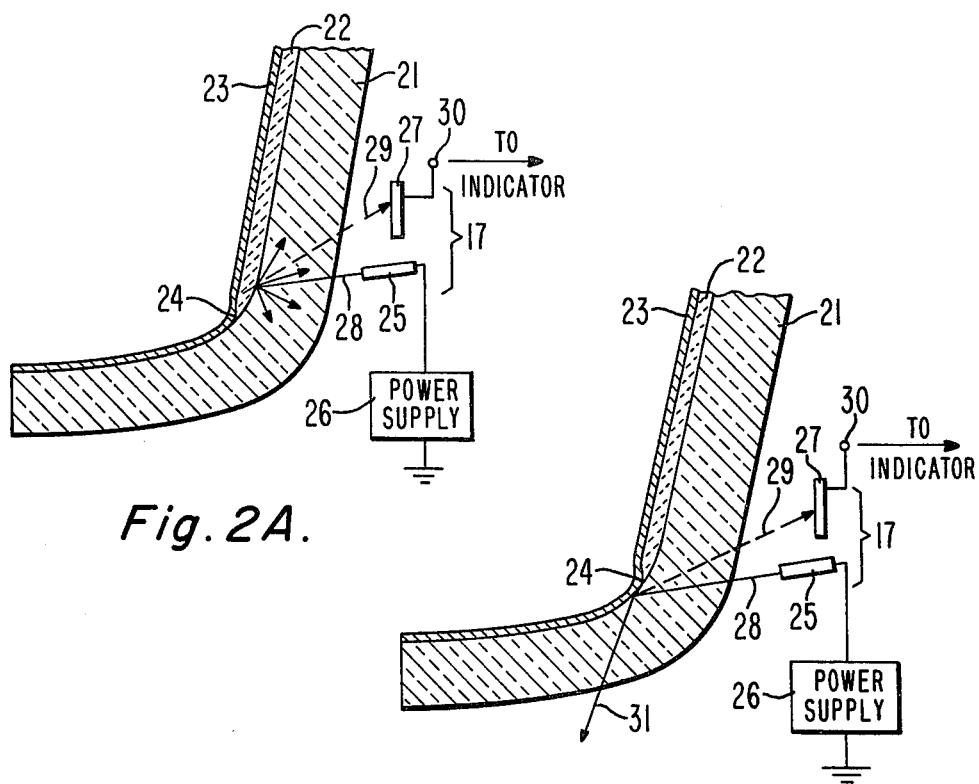
Fig. 2A.
Fig. 2B.

KINESCOPE SCREEN CENTER LOCATOR

This invention relates to apparatus for locating the center of a kinescope display screen incorporating screen edge sensing means.

A television picture is formed by scanning an electron beam across the kinescope or picture tube display screen in an orderly pattern. The electron beam strikes the phosphorescent coating on the display screen which emits visible light. The electron beam scans the kinescope display screen from left to right and from top to bottom. When the electron beam reaches the right side and/or bottom of the screen, it must be quickly returned to its starting position at the left and/or top of the screen. During this beam return or retrace, the electron beam is shut off or blanked so that the retrace is not visible on the screen. During vertical retrace, approximately 20 horizontal scan lines must be blanked. This vertical blanking is done outside the viewed picture area, since it would be noticeable as a black horizontal strip if displayed on the screen. To insure that this vertical retrace strip is never seen, the display screen is overscanned by the electron beam; that is, some video information falls outside the area of the display screen, and is not seen.

If the raster is not centered vertically on the display screen, the vertical retrace strip may be visible even with overscanning. In less extreme cases, miscentering of the raster will result in a noticeable imbalance of video information, or the loss of information at the top or bottom of the screen.

In order to correctly center the raster on the display screen, it is necessary to locate the electrical center of the deflection field, which is the center of the raster, and then align this electrical center with the physical center of the display screen, for example, by moving the deflection yoke with respect to the kinescope neck, or adjusting magnetic neck components. This procedure may be utilized in the production of kinescope-yoke combinations, where the yoke is adjusted into its final position through the use of a yoke adjustment machine (YAM), in a process known as "yamming". The YAM interacts with the yoke coils and the kinescope neck components through a system of nonmagnetic gears, belts and pulleys. The YAM operator can make the necessary yoke adjustments through controls on the front panel of the YAM.

The YAM, therefore, can be used to adjust the yoke in order to correctly center the raster with respect to the kinescope display screen. Techniques for locating the electrical center of the raster are the subject matter of a currently pending U.S. patent application.

Locating the physical center of the display screen on a dormant or nonilluminated tube can be difficult and time consuming. To increase the efficiency of the yoke adjusting operation, it is desirable to locate and mark the physical center of the screen separate from the YAM, therefore requiring that this step be done on a nonenergized or dormant tube. Although the dimensions of the phosphorescent display screen are known with precision, it is difficult to measure the desired distance from the edge to the center of the screen using remote measuring techniques. The significant refractive effects due to the thickness of the tube glass also distorts the measurement, making it difficult to determine the actual location of the screen edge.

The present invention is directed to a locator apparatus for use with a television kinescope. In accordance with the invention, the locator apparatus comprises screen edge sensing means that accurately locate the boundary between the display screen and the aluminum reflective coating on the interior surface of the kinescope front panel. The screen edge sensor comprises means for directing a beam of light toward the kinescope front panel along a first light path which intersects the interior surface in the vicinity of the screen edge. The edge sensor also comprises means for detecting the light returned from the interior surface along a second light path. Means are provided for moving the sensing means for traversing the screen edge boundary. Means are further provided which are responsive to the output from the detector for indicating changes in magnitude of light returned along the second light path during traversal of the screen edge by the edge sensor.

In the accompanying drawing:

FIG. 1 is a front elevational view of a kinescope display screen center locator, embodying the present invention;

FIGS. 2A and 2B illustrate interactions between front panel elements of a color kinescope (shown in cross section) and screen edge sensor elements of the locator apparatus of FIG. 1, for different sensor positions;

Figure 3:
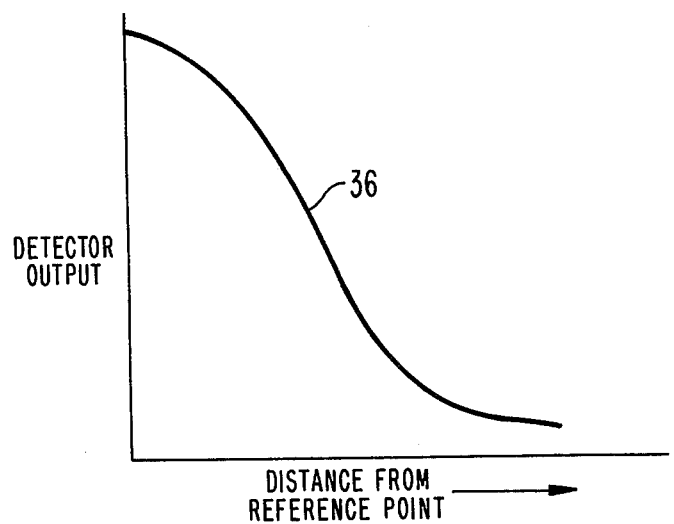
FIG. 3 illustrates graphically output function variations of the screen edge sensor elements of the locator apparatus of FIG. 1, useful in explaining the present invention.

Referring to FIG. 1, there is shown a kinescope display screen center locator for finding and identifying the location of the horizontal centerline of the phosphorescent display screen of a television kinescope. The locator comprises a kinescope support frame 11 for securely holding a kinescope 12. A vertically movable member 13 is positioned at the front of the support frame 11. The upper end of member 13 passes through a housing 14 which encloses drive means for moving member 13. The lower end of member 13 passes through a housing 15 which contains means for holding member 13 in the desired position on the frame 11. Screen edge sensing means 16 and 17 are mounted to the member 13 with a predetermined separation. The predetermined separation of sensing means 16 and 17 corresponds to the known vertical dimension of the kinescope phosphorescent display screen. Tube marking means 20 is mounted to member 13 precisely halfway between sensing means 16 and 17. For illustrative purposes, marking means 20 may be an ink jet printing device, which affixes some type of identifying mark on the tube surface. The ink is removable at the completion of the yoke and kinescope adjustment.

Referring to FIGS. 2A and 2B, the operation of screen edge sensor 17 shown in FIG. 1 will now be described. Sensing means 16 operates in an identical manner. The kinescope 12 comprises a glass tube cap 21 which attaches to the tube funnel (not shown) to form the kinescope envelope. A phosphorescent coating 22 which forms the kinescope display screen, is deposited on the interior surface of the front portion of the tube cap 21 through photoresistive techniques. A reflective aluminum coating 23 is applied to the interior of the tube cap 21 over the phosphorescent coating 22, thereby overlapping the coating 22. The aluminum coating 23 reduces the light lost inside the tube from the display screen. The phosphorescent coating 22 forms a boundary 24 with the aluminum coating 23.

Screen edge sensing means 17 comprises a light source 25 which directs a beam of light approximately 30 mils in diameter toward the front of the kinescope 12 along a first light path 28. The first light path 28 intersects the interior surface of the tube cap 21 in the vicinity of the boundary 24. In FIGS. 2A and 2B, light source 25 is illustratively shown as a laser, but any source which produces a light beam, such as a fiber optic system, may be used. Laser 25 is powered by power supply 26. Located adjacent to laser 25 is a photocell detector 27. Photocell 27 is positioned to detect light returned from the phosphorescent coating 22 and the aluminum 23 along a second light path 29. The output of detector 27 is present at a terminal 30, which may be connected to an indicator apparatus (not shown). The output of the detector of sensing means 16 is likewise present at a corresponding terminal 30'.

Laser 25 is directed toward the kinescope 12 in the region of the phosphor-aluminum boundary 24. When laser 25 is energized, the emitted light passes through the glass tube cap 21 and strikes the interior tube coatings. The differences in the optical effects of the light striking the phosphorescent coating 22 and the aluminum coating 23 is advantageous in determining the location of the boundary 24. When the light beam from laser 25 strikes the phosphorescent coating 22, the light is scattered or diffused in a substantially random pattern about the impact point. The intensity of the portion of scattered or diffused light returned along light path 29 can be measured by detector 27. It is desirable that the wavelength of the impinging light be such that it is not significantly absorbed by the phosphor coating 22, so that sufficient light is returned along light path 29 in order to be detected by detector 27. The signal from detector 27, present at electrical terminal 30, may be used in conjunction with some form of indicating apparatus (not shown).

When the laser 25 is moved so that the light path 28 intersects the aluminum coating 23 as shown in FIG. 2B, the light is almost totally reflected, with very little diffusion or scattering. With the detector 27 placed so that light path 29 does not coincide with the path of the reflected light (indicated by arrow 31 in FIG. 2B) the intensity of the light detected by detector 27 along light path 29 will be very small in comparison to that detected along light path 29 in the presence of the diffused light shown in FIG. 2A.

Laser 25 will be positioned at the boundary 24, therefore, when one half the beam falls on the phosphor coating 22 and one half the beam falls on the aluminum coating 23. While the beam is traversing the junction 24, the detector output will pass between the values occurring when the beam falls completely on the phosphor 22 and completely on the aluminum coating 23, resulting in an output function similar to that represented by the curve 36 in FIG. 3. The output of the detector of sensing means 16 will follow an identical curve as that shown in FIG. 3.

Figure 4:
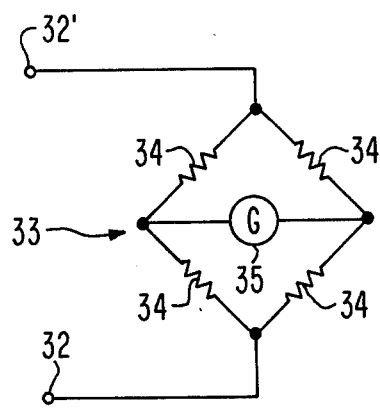
FIG. 4 illustrates schematically an indicator circuit for use in the locator apparatus of FIG. 1.

The outputs of the detectors of sensing means 17 and 16 present at terminals 30 and 30' are applied to terminals 32 and 32', respectively, of the Wheatstone bridge circuit 33 shown in FIG. 4. Wheatstone bridge circuit 33 comprises resistors 34, all having equal resistance value, and galvanometer 35. The operation of a Wheatstone bridge is well known. When the current levels at terminals 32 and 32' are equal, the current flow through all of resistors 34 will be equal, and no current will flow through galvanometer 35. Movable member 13, carrying sensing means 16 and 17 at a fixed separation, equal to the vertical dimension of the phosphor coating 22, can be positioned such that the detector outputs from sensing means 16 and 17 are equal. When it is known that the detector outputs are equal, it can be concluded that sensing means 16 and 17 are located at identical positions with respect to boundary 24 at the top and bottom of the screen. This is known since the detector outputs both follow the function illustrated by curve 36 of the graph in FIG. 3. When the Wheatstone bridge is balanced, the marking means 20 will be located at the center of the phosphor coating or display screen area. Marking means 20 may be activated to place a small ink droplet on the tube face at the display screen centerline location to be used for alignment purposes during "yamming" of the tube. By physically marking the tube, the center location operation can be done at a different time and place than the yoke and tube adjustments. If the center locating is to be done during the "yamming" operation, physical marking of the tube is not necessary, as some type of mechanical alignment marker can be attached to member 13 in place of marking means 20.

One primary advantage of the previously described invention for screen center locating is that the entire operation is done while the tube is dormant. If the center locating is done remote from the YAM, means for energizing the tube is unnecessary. If the center locating is done during "yamming", it can be accomplished during the tube warmup, thereby increasing the efficiency of the YAM. Other applications of this invention may be used during manufacture and assembly of the kinescope, whenever the location of the display screen center is desired.

It is possible to locate the screen center by using only one edge sensing means by interpolating along the curve 36 in FIG. 3 to determine an average value of detector output between the function limits (i.e., detector output when the light beam falls completely on the phosphor 22 or the aluminum 23). Once this average value is determined, the graph illustrated in FIG. 3 can be used to determine the edge location from a known initial reference point. Since the phosphor screen dimensions are known, a simple measurement from the edge to the center can be made. The location of the center can be marked in a manner similar to that described in connection with the marking means of FIG. 1. One disadvantage of this method is that the refractive properties of the glass of the tube cap 21 distort the apparent location of the screen edge. Compensation for these errors can be made, knowing the magnitude of the refraction, but changes in glass composition or manufacturing may change the refractive properties. The use of two sensing means as shown in FIG. 1 reduces the effect of glass refraction on measurement accuracy since the refractive properties of the glass effect each sensing means in a compensating manner. The use of two sensing means with the Wheatstone bridge circuit also greatly increases sensitivity over one sensing means.

What is claimed is:

1. Locator apparatus for use with a kinescope, said kinescope having a front panel and including a phosphorescent display screen deposited on an interior surface of said front panel, and a coating of reflective material exhibiting reflective characteristics different than said display screen, said coating overlying said display screen and overlapping said display screen at the edges thereof; said locator apparatus comprising:

means for directing a beam of light toward said front panel along a first light path intersecting a region of said interior surface in the vicinity of one of said edges;

means for detecting light returned from said intersected region along a second light path of a given orientation with respect to said first light path;

means for conjointly moving said beam directing means and said light detecting means in a direction substantially perpendicular to said one edge in such a manner as to cause said region of intersection to traverse said one edge; and means responsive to the output of said light detecting means for providing an indication of changes in the magnitude of light returned along said second light path during said traversal of said one edge.

2. A kinescope display screen center locator for use with a kinescope having a front panel and including a phosphorescent display screen and a reflective coating applied to the interior surface of said front panel, said coating overlapping said display screen at the edges thereof; said screen center locator comprising:

a vertically-mounted movable member disposed adjacent to the front of said kinescope;

means for moving said member;

first and second light sources fixedly mounted to said movable member adjacent the top and bottom edges of said display screen, for directing a beam of light at said front panel along a first and second light path intersecting regions of said interior surface in the vicinity of said screen edges, said sources mounted a predetermined distance apart;

first and second means for detecting the radiation from said first and second sources that is returned from said interior surface along third and fourth light paths and generating first and second signals representative of the magnitude of said returned light;

means coupled to said detecting means for comparing said first and second signals; and marking means, fixedly mounted to said movable member mid-way between said first and second radiation sources, for locating the center of said screen when said first and second signals are equal in magnitude.

3. The screen center locator defined in claim 2, wherein the comparing means comprises a Wheatstone bridge.

4. The screen center locator defined in claim 2, wherein said predetermined distance said sources are mounted apart is the distance between the top and bottom edge of said display screen.

5. The screen center locator defined in claim 2, wherein said kinescope is nonilluminated.

* * * * *

UNITED STATES PATENT AND TRADEMARK OFFICE
CERTIFICATE OF CORRECTION

PATENT NO. : 4,261,013
DATED : April 7, 1981
INVENTOR(S) : Marinus Van Renssen et al It is certified that error appears in the above—identified patent and that said Letters Patent is hereby corrected as shown below:

On the title sheet (both places) Inventor's name "Marinus Van Renseen" should be --Marinus Van Renssen--.

Signed and Sealed this

Twenty-eighth Day of July 1981

[SEAL]

Attest:

GERALD J. MOSSINGHOFF

Attesting Officer  Commissioner of Patents and Trademarks